(No Model.) 2 Sheets—Sheet 1.
C. LUETEKE.
MACHINE FOR MOLDING BREAD, CAKES, &c.
No. 575,609. Patented Jan. 19, 1897.
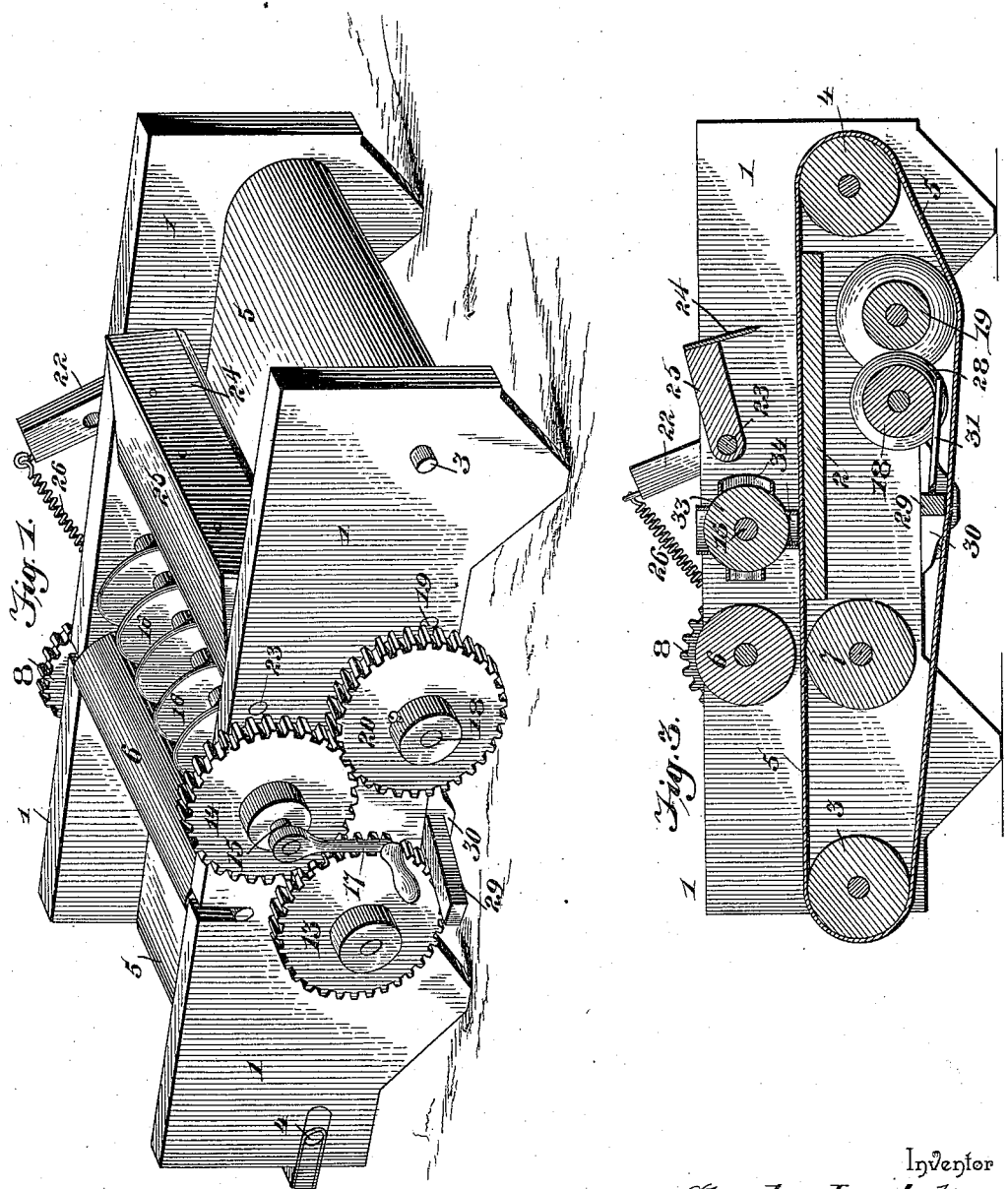
Witnesses
H. G. Dieterich
V. B. Hillyard.
Inventor
Charles Lueteke
By his Attorneys,
C. A. Snow & Co.

(No Model.) 2 Sheets—Sheet 2.
C. LUETEKE.
MACHINE FOR MOLDING BREAD, CAKES, &c.
No. 575,609. Patented Jan. 19, 1897.
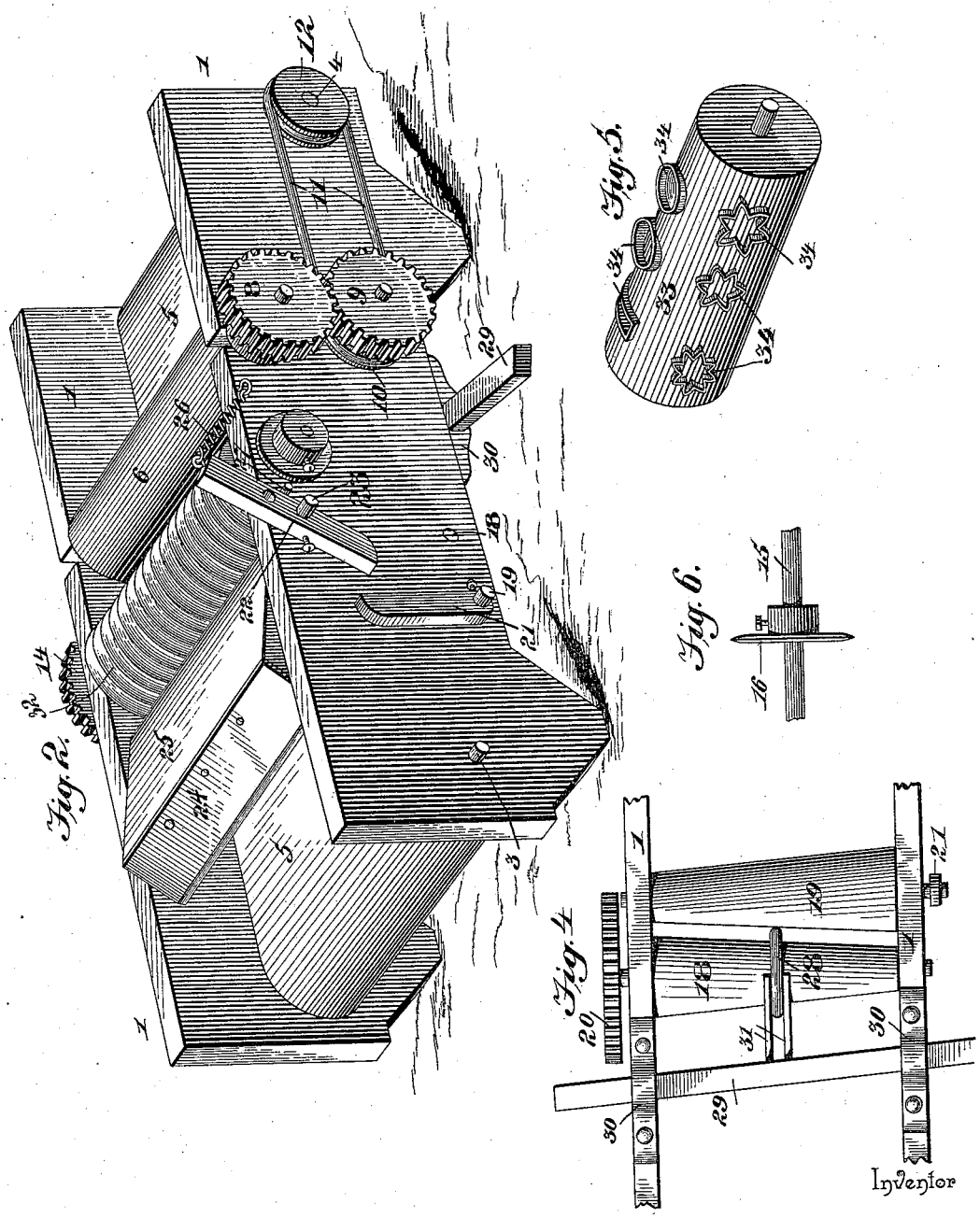
Witnesses
H. T. Dieterich
V. B. Hillyard
Inventor
Charles Lueteke,
By his Attorneys,
C. A. Snow & Co.

UNITED STATES PATENT OFFICE.

CHARLES LUETEKE, OF GREENCASTLE, INDIANA.

MACHINE FOR MOLDING BREAD, CAKES, &c.

SPECIFICATION forming part of Letters Patent No. 575,609, dated January 19, 1897.

Application filed June 26, 1896. Serial No. 597,009. (No model.)

*To all whom it may concern:*

Be it known that I, CHARLES LUETEKE, a citizen of the United States, residing at Greencastle, in the county of Putnam and State of Indiana, have invented certain new and useful Improvements in Machines for Molding Bread, Cakes, &c., of which the following is a specification.

This invention relates to machines for forming dough into the required shape as an intermediate step between the kneading and the baking operation, whereby loaves of bread, rolls, biscuits, crackers, or cakes may be given the desired shape, according to the character of the dough and the pattern of the cutter placed in position.

One of the principal objects of the invention is to construct a machine which is adjustable in its parts, so that different-sized loaves of bread, thick, long, broad, or thin, may be fashioned without interchanging parts, and when cakes, crackers, pretzels, &c., are to be formed a rotary cutter can be placed in position to effect the desired end.

When shaping pretzels, loaves of bread, rolls, biscuits, cakes, crackers, &c., of regular shape as to width and length, two cutters, namely, a rotary cutter and a reciprocating cutter, are disposed so as to act jointly, the rotary cutter forming the sheet of dough into strips and the reciprocating cutter subdividing the strips into required lengths, according to the shape to be given to the article. Provision is had for varying the speed of the reciprocating cutter, whereby the strips may be cut into any required length, and the rotary cutter comprises a shaft and circular blades, the latter being adjustable on the shaft to vary the width of the strips.

The improvement consists of the novel features and the peculiar construction and combination of the parts, which hereinafter will be more fully set forth, illustrated, and finally embodied in the subjoined claims.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a machine especially designed for attaining the objects of this invention. Fig. 2 is a view similar to Fig. 1 from the opposite side of the machine, showing the bread-cutter replaced by a pretzel-cutter. Fig. 3 is a longitudinal section of the machine, showing a cracker or cake cutter in place. Fig. 4 is a detail view of the means for varying the speed or action of the reciprocating cutter with respect to the speed of the machine or rotary cutter. Fig. 5 is a detail view of a roller bearing cutters of different shapes, according to the configuration of the crackers or cakes to be formed. Fig. 6 is a detail view of a circular cutter and its shaft, showing the means for securing the cutter in an adjusted position.

Corresponding and like parts are referred to in the following description and indicated in the several views of the accompanying drawings by the same reference-characters.

The frame of the machine comprises similar side pieces 1 and an intermediate connecting-piece 2, the latter forming a support to sustain the dough against the action of the several cutters. Rollers 3 and 4 are located at the opposite ends of the frame and are journaled in the side pieces thereof and support an endless carrier 5, the latter being preferably a strip of canvas or like material, upon which is placed the dough after being thoroughly kneaded. The upper portion of the endless carrier passes over the connecting-piece 2 and is prevented from sagging thereby under the weight of the dough placed thereon. Pressing-rollers 6 and 7 are located intermediate the ends of the frame, the one above, the other below, the top portion of the endless carrier, and are designed to spread the dough in a sheet as the latter is carried forward by the action of the machine and prior to presenting the sheet of dough to the cutters by means of which the dough is given the required shape prior to baking.

The journals of the pressing-rollers 6 and 7 are extended beyond the sides of the frame, and a gear-wheel 8, secured to a journal of the top roller 6, meshes with a companion gear-wheel 9 on the adjacent journal of the lower roller 7. A pulley 10 is secured upon the same journal with the gear-wheel 9, and an endless band 11 connects the pulley 10 with a corresponding pulley 12 on a journal of the roller 3, thereby transmitting motion from the roller 7 to the roller 3 and from the latter to the endless carrier 5. A gear-wheel 13 is secured to the journal of the roller 7 opposite to the journal bearing the gear-wheel 9, and is in mesh with a companion gear-wheel 14, secured upon the projecting end of a shaft 15, extending parallel with the pressing-rollers 6 and 7 and located above the endless carrier and bearing the circular cutters 16, which latter are adjustable on the shaft, whereby the distance between them may be varied according to the thickness or width of the strips required to be cut. The power for operating the machine is applied to the shaft 15, and in the event of it being required to operate the machine by hand a crank 17 is fitted to a projecting end of the shaft 15.

Speed-cones 18 and 19 are located below the connecting-piece 2, and are journaled at or near their ends in the side pieces of the frame. A gear-wheel 20 is secured to a journal of the cone 18 and meshes with the gear-wheel 14, and a tappet 21 is made fast to a journal of the cone 19 and revolves with the latter. This tappet 21 in its travel engages with a trip or arm 22, keyed upon a rock-shaft 23, obtaining bearings in the side pieces of the frame and imparts a motion to said trip which is transmitted to and effects a vibratory or reciprocating motion of the cutter 24, the latter being applied to an edge of a plate or strip 25 having connection with the rock-shaft 23.

A spring 26 is interposed between the upper end of the trip or arm 22 and the adjacent side of the machine, and serves to hold the cutter 24 elevated, a stop 27 being provided to limit the movement of the said trip or arm when acted upon by the spring 26.

A flexible ring 28 is mounted upon one of the speed-cones and serves to transmit motion from one cone to the other, and a shipper-lever 29, operating in guides 30, has a fork 31 which embraces the sides of the flexible ring, so as to move the latter to the required position, whereby the cutter 24 may be caused to reciprocate more or less rapidly with respect to a given speed, whereby the length of the loaves, strips, or cakes can be varied.

The pretzel-cutter 32 consists of a roller having a series of peripheral corrugations, providing annular edges which divide the sheet of dough into half-round narrow strips, the latter being cut the requisite length by the action of the reciprocating cutter 24. This pretzel-cutter is placed upon the shaft 15 or may be provided with journals, which obtain bearings in the side pieces 1 in a similar manner to the shaft 15. The cracker or cake cutter 33 is a roller having a series of cutters 34 of varying patterns, according to the shape and outline desired to be given to the finished cakes and crackers. This cutter, like the pretzel-cutter, is substituted for the circular cutters 16 when the machine is designed for forming cakes, crackers, &c.

The dough being thoroughly kneaded is placed upon the endless carrier and is moved by the latter between the pressing-rollers 6 and 7 and is spread into a sheet of requisite thickness, according to the distance between the said pressing-rollers. This sheet of dough is cut into strips by the circular cutters 16, and the strips are again subdivided by the reciprocating cutter 24, so as to form loaves of bread, rolls, or biscuits of the required size.

When the machine is designed for molding fancy cakes or crackers, the rotary cutter 33 is substituted for the circular cutters 16 and the reciprocating cutter 24 is thrown out of action, as the desired pattern or form is given to the cakes or crackers by the cutters 34.

Having thus described the invention, what is claimed as new is—

1. In a machine for molding bread, cakes, &c., the combination of a support, a pair of feed-rollers located at one end of the support, the lower roller having its upper surface about flush with the top of the support, a rotary cutter located above the support in the rear of the feed-rollers for subdividing the dough longitudinally, an endless carrier passing between the feed-rollers and between the rotary cutter and the support for advancing the dough to the said rollers and cutter, a rock-shaft, a cutter having connection with the rock-shaft, a trip secured to the rock-shaft, a spring having connection with the trip for returning the rock-shaft and the cutter carried thereby to a normal position, a tappet for operating the trip, and actuating mechanism for the operating parts, substantially as set forth.

2. A machine for molding bread, cakes, &c., comprising a support, a pair of rollers at one end of the support, the upper surface of the lower roller being about flush with the top of the support, a rotary cutter in the rear of the pair of rollers and above the support, a rock-shaft, a cutter attached to the rock-shaft and operating in the rear of the rotary cutter and above the said support, an endless carrier having its upper portion passing over the aforesaid support and between it and the cutters, and between the pair of rollers, a trip secured to one end of the rock-shaft, a spring for normally returning the rock-shaft and the cutter carried thereby to a normal position, a changeable-speed gearing, a tappet having connection with and operated by means of the changeable-speed gearing for actuating the rock-shaft and its cutter, and mechanism for operating the endless carrier, the said pair of rollers, and the rotary cutter at about a uniform rate of speed, substantially as set forth.

In testimony that I claim the foregoing as my own I have hereto affixed my signature in the presence of two witnesses.

CHARLES LUETEKE.

Witnesses:
 ROSE A. GAINER,
 BELLE GRAHAM.